(12) United States Patent
Kumar et al.

(10) Patent No.: US 9,277,554 B2
(45) Date of Patent: Mar. 1, 2016

(54) SERVERS AND METHODS FOR OPERATING A COMMUNICATION SYSTEM

(75) Inventors: Anil Kumar, Sammamish, WA (US); Arun Ayyagari, Seattle, WA (US)

(73) Assignee: The Boeing Company, Chicago, IL (US)

( * ) Notice: Subject to any disclaimer, the term of this patent is extended or adjusted under 35 U.S.C. 154(b) by 136 days.

(21) Appl. No.: 13/604,437

(22) Filed: Sep. 5, 2012

(65) Prior Publication Data

US 2014/0068079 A1 Mar. 6, 2014

(51) Int. Cl.
*G06F 15/16* (2006.01)
*H04W 72/04* (2009.01)
*H04W 16/14* (2009.01)

(52) U.S. Cl.
CPC .......... *H04W 72/0453* (2013.01); *H04W 16/14* (2013.01)

(58) Field of Classification Search
CPC .... H04W 16/14; H04W 16/188; G06F 12/12; G06F 12/36
See application file for complete search history.

(56) References Cited

U.S. PATENT DOCUMENTS

| | | | |
|---|---|---|---|
| 7,535,875 B2 | 5/2009 | Poston | |
| 7,646,744 B2 | 1/2010 | Li | |
| 8,064,840 B2 | 11/2011 | McHenry et al. | |
| 8,140,017 B2 | 3/2012 | Shi et al. | |
| 8,213,868 B2 | 7/2012 | Du et al. | |
| 8,248,968 B2 | 8/2012 | Handforth et al. | |
| 2008/0279256 A1* | 11/2008 | Zhao et al. | 375/130 |
| 2011/0085538 A1* | 4/2011 | Feinberg | 370/343 |
| 2011/0116439 A1* | 5/2011 | Kawasaki | 370/315 |
| 2011/0187591 A1 | 8/2011 | Walker, Sr. | |
| 2011/0250916 A1* | 10/2011 | Li et al. | 455/509 |
| 2012/0282962 A1* | 11/2012 | Madon et al. | 455/509 |
| 2013/0078924 A1* | 3/2013 | Choudhury et al. | 455/62 |
| 2013/0303128 A1* | 11/2013 | Wang et al. | 455/411 |

* cited by examiner

*Primary Examiner* — Djenane Bayard
(74) *Attorney, Agent, or Firm* — Armstrong Teasdale LLP

(57) ABSTRACT

A server includes a memory device configured to store a plurality of computer-executable instructions, and a processor coupled to the memory device. When the processor executes the plurality of computer-executable instructions, the processor is programmed to determine an available spectrum of frequencies within a location over time, and receive a request from a wireless device to access the available spectrum for a predefined duration. The processor is also programmed to select a frequency band within the spectrum that is available to be used by the wireless device for the predefined duration, and transmit an authorization message to the wireless device to use the selected frequency band.

16 Claims, 4 Drawing Sheets

SERVERS AND METHODS FOR OPERATING A COMMUNICATION SYSTEM

BACKGROUND

The field of the disclosure relates generally to communication systems, and more specifically, to servers and methods for operating a communication system.

At least some known communication systems include a network access point, such as a wireless access point, that enables a plurality of devices to be communicatively coupled together and/or to communicatively couple the devices to a network such as the Internet. Within a building or another location, a large number of devices, such as cellular phones, embedded controllers, computing devices of a mobile computing infrastructure, and/or other computing devices, may communicate wirelessly with each other and/or with other systems. Such devices may generate a significant amount of radio frequency signals which may cause interference to occur between the signals of the devices. Such interference may cause a reduction in an amount of bandwidth available to each device within the location. In certain circumstances, the interference may render a device unable to communicate with other devices.

BRIEF DESCRIPTION

In one aspect, a server is provided that includes a memory device configured to store a plurality of computer-executable instructions, and a processor coupled to the memory device. When the processor executes the plurality of computer-executable instructions, the processor is programmed to determine an available spectrum of frequencies within a location over time, and receive a request from a wireless device to access the available spectrum for a predefined duration. The processor is also programmed to select a frequency band within the spectrum that is available to be used by the wireless device for the predefined duration, and transmit an authorization message to the wireless device to use the selected frequency band.

In another aspect, a method of operating a communication system is provided that includes determining an available spectrum of frequencies within a location over time, receiving a request from a wireless device to access the available spectrum for a predefined duration, selecting, by a processor within the communication system, a frequency band within the spectrum that is available to be used by the wireless device for the predefined duration, and transmitting an authorization message to the wireless device to use the selected frequency band.

The features, functions, and advantages that have been discussed can be achieved independently in various embodiments or may be combined in yet other embodiments, further details of which can be seen with reference to the following description and drawings.

DETAILED DESCRIPTION

Figure 1:
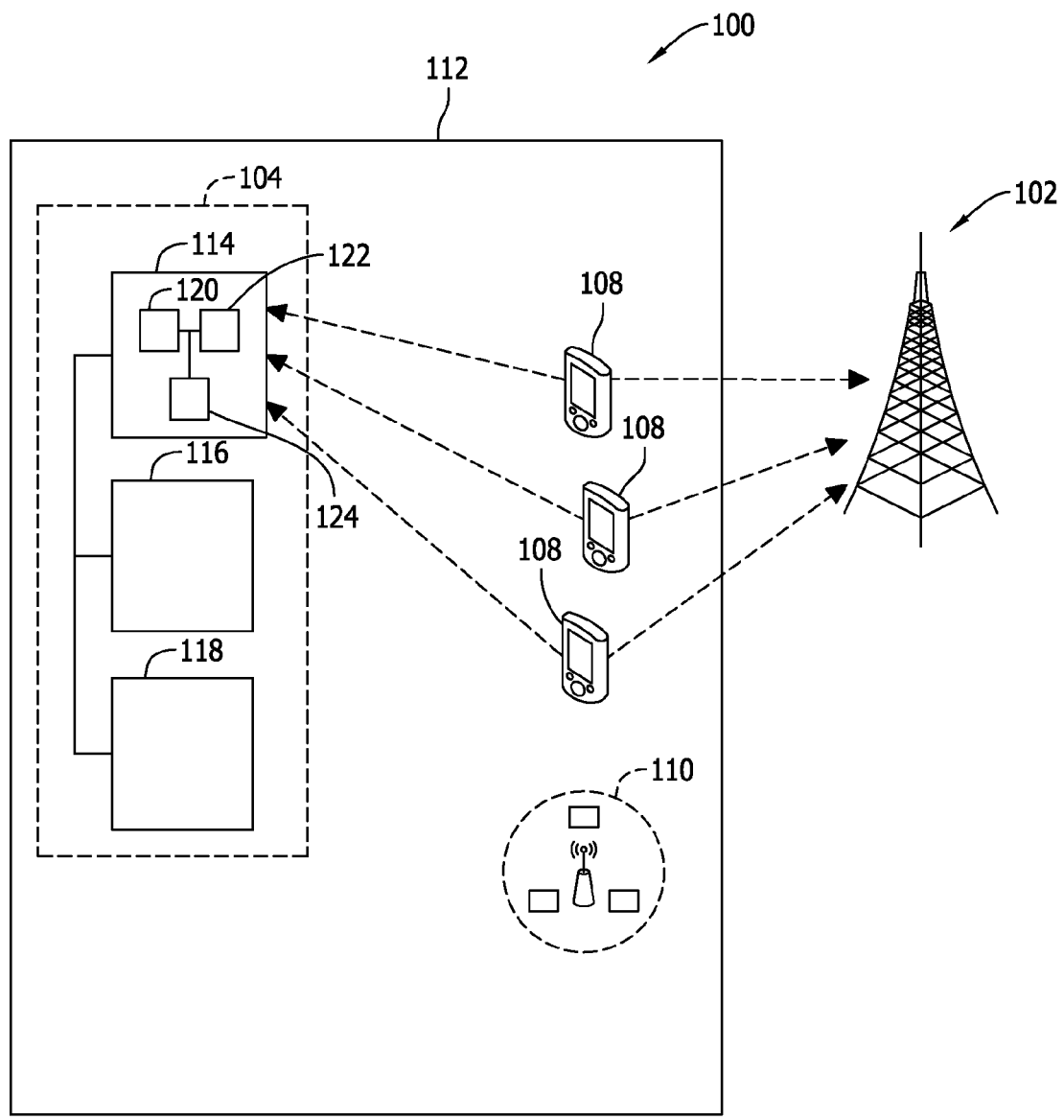
FIG. 1 illustrates an exemplary communication system that includes a plurality of wireless devices.

FIG. 1 is a block diagram of an exemplary communication system 100. In the exemplary embodiment, communication system 100 includes a base station 102, a spectrum management system 104, a communication network 106, and one or more wireless devices 108. In one embodiment, communication system 100 also includes a wireless network 110. In the exemplary embodiment, spectrum management system 104, communication network 106, wireless devices 108, and wireless network 110 are positioned within a location 112, such as a factory or another building. Alternatively, spectrum management system 104, communication network 106, wireless devices 108, and/or wireless network 110, and/or components thereof, are positioned in any other location that enables communication system 100 to function as described herein. In another embodiment, communication system 100 is an ad-hoc system that does not include base station 102.

In the exemplary embodiment, base station 102 includes a transmission tower that transmits wireless signals throughout communication system 100. Base station 102 is positioned external to location 112 but is positioned such that location 112 is within a transmission range of base station 102. In the exemplary embodiment, base station 102 transmits wireless signals within one or more television (TV) broadcast bands of frequencies. The TV broadcast bands are typically predefined by regulation, and may include, for example, frequencies between about 54 megahertz (MHz) and about 698 MHz. More specifically, the TV broadcast bands may include frequencies between about 54 MHz and about 72 MHz, between about 76 MHz and about 88 MHz, between about 174 MHz and about 216 MHz, between about 470 MHz and about 608 MHz, and/or between about 614 MHz and about 698 MHz. Alternatively, base station 102 transmits wireless signals within any suitable radio frequency bands, including regulated and/or industrial, scientific, and medical (ISM) bands.

Spectrum management system 104 includes a server 114, a database 116, and at least one spectrum sensor 118. Server 114 includes at least one processor 120, at least one memory device 122, and at least one communication device 124.

Processor 120 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 122 includes a computer readable storage medium, such as, without limitation, random access memory (RAM), flash memory, a hard disk drive, a solid state drive, a diskette, a flash drive, a compact disc, a digital video disc, and/or any suitable memory. In the exemplary embodiment, memory device 122 includes data and/or instructions that are executable by processor 120 (i.e., processor 120 is programmed by the instructions) to enable processor 120 to perform the functions described herein.

Communication device 124 may include, without limitation, a network interface controller (NIC), a network adapter, a transceiver, a public switched telephone network (PSTN) interface controller, or any other communication device that enables communication system 100 to operate as described herein. Communication device 124 may connect to communication network 106, to database 116, and/or to spectrum sensor 118 using any suitable communication protocol. In the exemplary embodiment, communication network 106 and communication device 124 use a wired Ethernet protocol.

In the exemplary embodiment, database 116 stores data representative of a list of the available spectrum of frequencies within location 112 with respect to time. In addition, database 116 stores a list of devices using the spectrum within location 112, such as wireless devices 108. In the exemplary embodiment, the data stored in database 116 is continuously updated as new data is received for the available spectrum and/or the devices using the spectrum. Accordingly, database 116 includes a spatio-temporal correlation of the available spectrum within a location 112 with respect to time.

Spectrum sensor 118, in the exemplary embodiment, is a sensor that detects and/or measures an amount of electromagnetic radiation and/or an amount of interference present at different frequencies. Spectrum sensor 118 provides an output indicative of the amount, or amplitude, of the radiation at each frequency. The output is used to determine an amount of "white space," or available spectrum or frequencies, within a spectrum of frequencies at a location. As used herein, the terms "white space," "unused frequency or spectrum," and "available frequency or spectrum" refer to one or more frequencies or frequency bands within which the amplitude of electromagnetic radiation, such as an amplitude of the radio frequency signals, is less than a predetermined threshold. The threshold may be set by a user, or may be a threshold set by an external device.

Communication network 106 is a network 106 that communicatively couples server 114, database 116, and/or spectrum sensor 118 together. In the exemplary embodiment, communication network 106 is a wired Ethernet network. Alternatively, communication network 106 may be any other wired or wireless network that enables communication system 100 to function as described herein.

Wireless network 110, in the exemplary embodiment, is a wireless Ethernet network that extends at least partially throughout location 112. In one embodiment, wireless network 110 operates using signal frequencies of about 900 megahertz (MHz), 2.4 gigahertz (GHz) and/or about 5 GHz. Alternatively, any wireless communication frequency and/or protocol may be used, such as Bluetooth, ultra-wideband (UWB), and/or cellular data networks, that enables communication system 100 to function as described herein. In the exemplary embodiment, wireless network 110 enables wireless devices 108 to communicate with each other, with other devices or systems within location 112, and/or with other devices and/or systems connected to the Internet or to an intranet. For example, in one embodiment, wireless network 110 is coupled to communication network 106.

Wireless device 108 may include any computing device that is able to wirelessly communicate with other devices. For example, wireless device 108 may include a smartphone, a tablet computing device, a laptop computer, a desktop computer, and/or any other device that enables communication system 100 to function as described herein. In the exemplary embodiment, wireless devices 108 are mobile devices that communicate at least partially using one or more TV broadcast band frequencies. In some embodiments, wireless device 108 communicates with other devices or systems, such as server 114, directly or indirectly through one or more networks such as wireless network 110 and/or communication network 106. Moreover, in the exemplary embodiment, wireless device 108 communicates with base station 102 using one or more TV broadcast band frequencies. Alternatively, wireless devices 108 transmit wireless signals to other wireless devices 108 and/or to base station 102 using any suitable radio frequency bands, including regulated and/or ISM bands.

Figure 2:
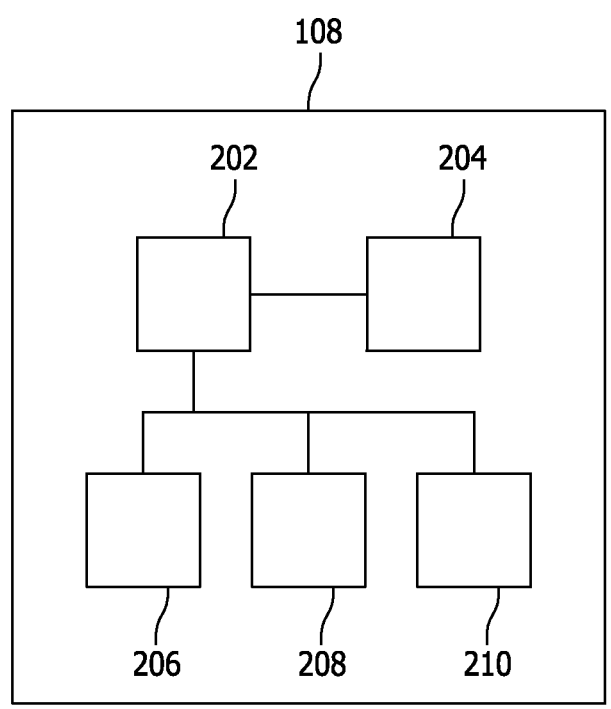
FIG. 2 is a block diagram of an exemplary wireless device that may be used with the communication system shown in FIG. 1.

FIG. 2 is a block diagram of an exemplary wireless device 108 that may be used with communication system 100 (shown in FIG. 1). In the exemplary embodiment, wireless device 108 includes a processor 202, a memory device 204, a wireless network transceiver 206, a TV broadcast band transceiver 208, and a wired network transceiver 210. Alternatively, wireless device 108 may not include wired network transceiver 210 and/or wireless network transceiver 206. While wireless device 108 is described herein as including TV broadcast band transceiver 208, wireless device 108 may use any transceiver that broadcasts and receives wireless signals within any frequency band that enables wireless device 108 to function as described herein.

Processor 202 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 204 includes a computer readable storage medium, such as, without limitation, random access memory (RAM), flash memory, a hard disk drive, a solid state drive, a diskette, a flash drive, a compact disc, a digital video disc, and/or any suitable memory. In the exemplary embodiment, memory device 204 includes data and/or instructions that are executable by processor 202 (i.e., processor 202 is programmed by the instructions) to enable processor 202 to perform the functions described herein.

Wireless network transceiver 206, in the exemplary embodiment, is a wireless Ethernet transceiver that communicates with wireless network 110. In one embodiment, wireless device 108 communicates with server 114 via wireless network 110 and/or communication network 106. In another embodiment, wireless device 108 communicates directly with server 114, or communicates with server 114 through communication network 106, bypassing wireless network 110.

TV broadcast band transceiver 208 enables wireless device 108 to communicate with other devices or systems using TV broadcast band frequencies. For example, wireless device 108 may communicate with base station 102 using one or more TV broadcast band frequencies to transmit and/or receive data between other devices communicatively coupled to base station 102.

In the exemplary embodiment, wired network transceiver 210 is a wired Ethernet transceiver. Wired network transceiver 210 may be coupled to communication network 106 to enable wireless device 108 to communicate with server 114, for example.

Figure 3:
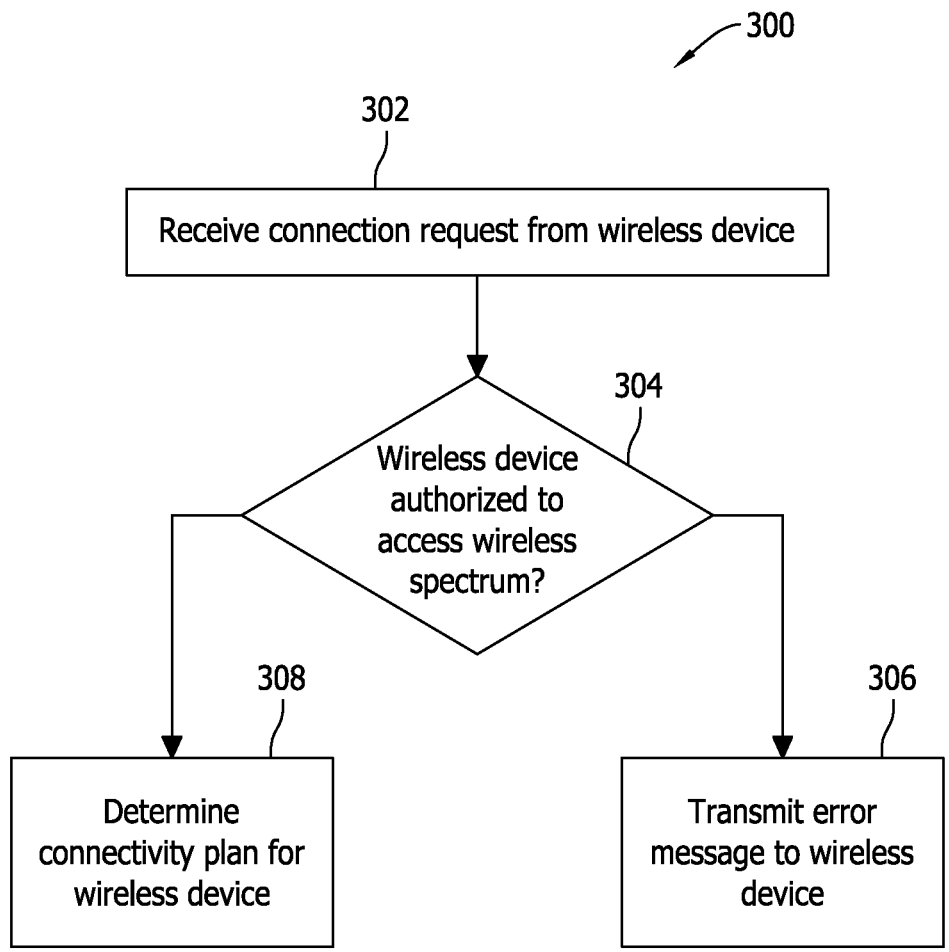
FIG. 3 is a flow diagram of an exemplary method of operating a communication system that may be executed by the system of FIG. 1.

FIG. 3 is a flow diagram of an exemplary method 300 of operating a communication system, such as communication system 100 (shown in FIG. 1). In the exemplary embodiment, method 300 is embodied within a plurality of computer-executable instructions that program server 114 (i.e., processor 120) to perform the functions described herein. Accordingly, in the exemplary embodiment, method 300 is executed by processor 120.

In the exemplary embodiment, server 114 receives 302 a connection request from a wireless device, such as wireless device 108 (shown in FIG. 1). More specifically, when wireless device 108 enters location 112 (shown in FIG. 1), or at a point in time after wireless device 108 enters location 112, wireless device 108 transmits a request to server 114 to access the wireless spectrum within location 112 for use in communicating with another device. For example, wireless device 108 transmits a request to server 114 to access a portion of the TV broadcast band within location 112 for a desired duration (also referred to herein as a "desired communication session duration" or a "desired session duration").

Server 114 determines 304 whether wireless device 108 is authorized to access the wireless spectrum. For example, server 114 accesses database 116 (shown in FIG. 1), or another device, to determine whether wireless device 108 is included within a list of authorized devices for location 112 and/or for the wireless spectrum. If server 114 determines that wireless device 108 is not authorized to access the wireless spectrum within location 112, server 114 transmits 306 an error message to wireless device 108 indicating that wireless device 108 is not authorized. However, if server 114 determines that wireless device 108 is authorized to access the wireless spectrum within location 112, server 114 determines 308 a connectivity plan for wireless device 108, as described more fully herein.

Figure 4:
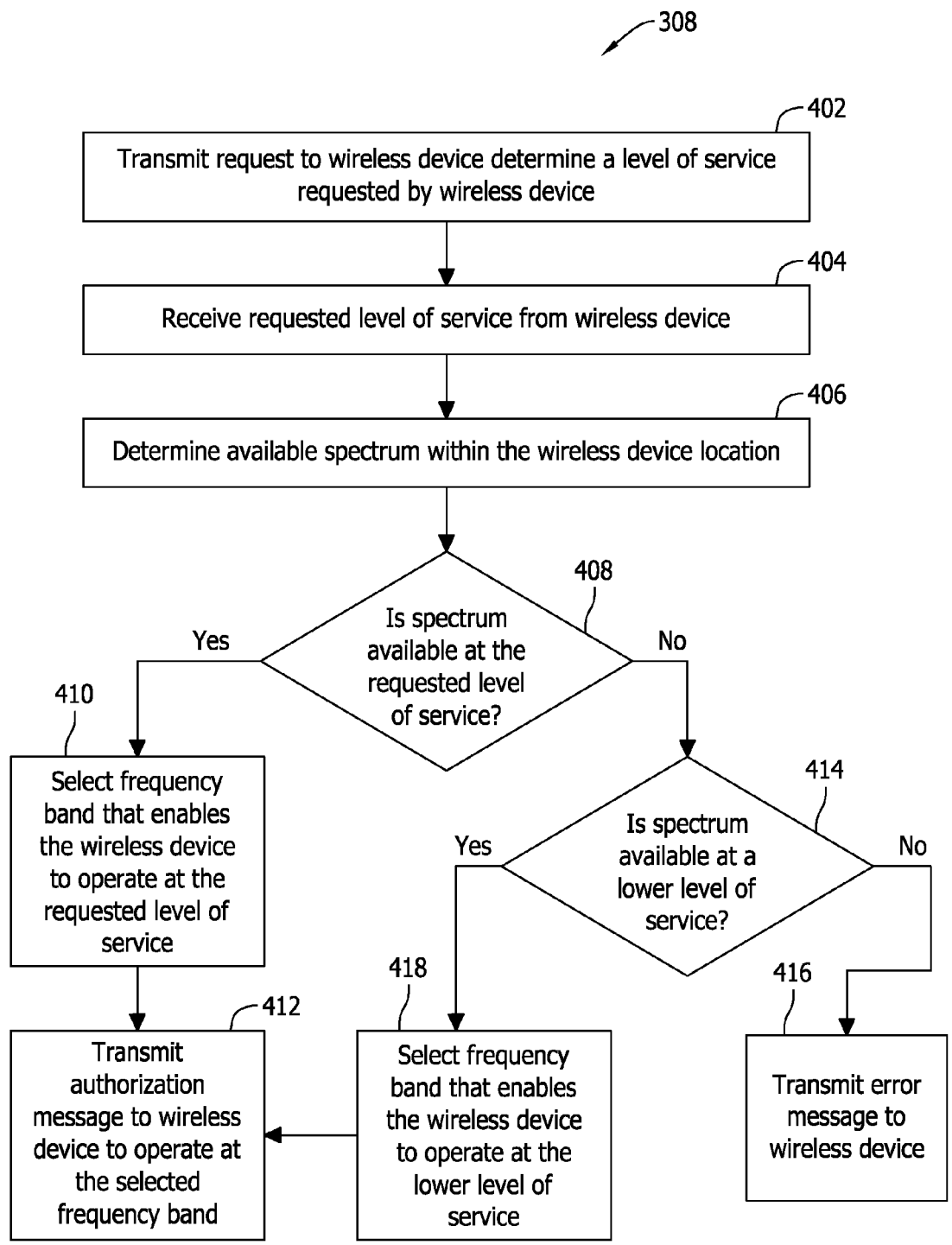
FIG. 4 is a flow diagram of an exemplary method that may be executed by the system of FIG. 1 to determine a connectivity plan for the wireless devices shown in FIG. 1.

FIG. 4 is a flow diagram of an exemplary method 308 of determining a connectivity plan for a wireless device, such as wireless device 108, to access a wireless spectrum within location 112 (shown in FIG. 1) for a desired duration. In the exemplary embodiment, method 308 is embodied within a plurality of computer-executable instructions that program server 114 (i.e., processor 120) to perform the functions described herein. Accordingly, in the exemplary embodiment, method 308 is executed by processor 120.

In the exemplary embodiment, a request is transmitted 402 to wireless device 108 to determine a level of service (e.g., a quality of service (QoS)) requested by wireless device 108. For example, the level of service requested by wireless device 108 may include or may specify a minimum bandwidth, a minimum latency, a priority level, a maximum amount of jitter or interference, a duration of a desired communication session, and/or any other aspect of the traffic (or data) transmitted from, or received by, wireless device 108. Server 114 receives 404 data representative of the requested level of service from wireless device 108. In one embodiment, server 114 communicates with wireless device 108 via wireless network 110 and/or communication network (shown in FIG. 1) to determine the requested level of service, for example.

Server 114 determines 406 the available spectrum within the wireless device location, i.e., within location 112. More specifically, server 114 determines the white space, or available spectrum, over time (e.g., for a duration of one or more current and/or future communication sessions) within the TV broadcast band within location 112 by accessing database 116. In the exemplary embodiment, server 114 references database 116 to determine a list of devices registered with database 116 that are accessing one or more spectrums and/or that are expected to access one or more spectrums within location 112 at a current time and/or at a time in the future.

In a specific embodiment, server 114 determines a geospatial usage of the spectrum with respect to time based on the expected spectrum usage of the registered devices over time and based on the measured and/or estimated usage of the spectrum by other devices and/or based on historical usage of the spectrum within location 112. Server 114 determines the available spectrum for the communication session based on the desired duration of the session and based on a determination of which frequency bands are expected to be available during the time of the communication session.

It should be recognized that wireless device 108, or other registered or unregistered devices, may move within location 112 and/or may move into or out of location 112. Accordingly, server 114 may associate or determine a mobility profile to wireless device 108 and/or other devices within location 114. The mobility profile may include, for example, a first frequency band usable by wireless device 108 within a first area of location 112 and a second frequency band usable by wireless device 108 if wireless device 108 moves to a second area of location 112.

Moreover, in the exemplary embodiment, server 114 determines 408 whether there is spectrum available at the requested level of service. For example, in one embodiment, server 114 determines whether sufficient bandwidth is available within the unused portions of the spectrum to enable wireless device 108 to operate at the requested level of service during the requested time. If server 114 determines 408 that sufficient spectrum is available at the requested level of service and time, server 114 selects 410 a frequency band within the spectrum that enables wireless device 108 to operate at the requested level of service.

Server 114 transmits 412 an authorization message to wireless device 108 to enable wireless device 108 to operate at the selected frequency band. Moreover, server 114 adds wireless device 108 to the list of devices using the spectrum (i.e., the list of devices using the selected frequency band) within database 116. Accordingly, server 114 updates database 116 to reflect that the selected frequency band is being used by wireless device 108 such that the portion of the spectrum may now be unavailable to other devices.

In contrast, if server 114 determines that sufficient spectrum is not available at the requested level of service, server 114 determines 414 whether sufficient spectrum is available at a lower level of service. If sufficient spectrum is not available at a lower level of service, server 114 transmits 416 an error message to wireless device 108 indicating that location 112 does not have sufficient spectrum available for wireless device 108.

If sufficient spectrum is available at the lower level of service, server 114 selects 418 a frequency band that enables wireless device 108 to operate at the lower level of service. Server 114 transmits 412 an authorization message to wireless device 108 to operate at the selected frequency band. In addition, server 114 updates database 116 to reflect that the selected frequency band is being used by wireless device 108 such that the portion of the spectrum may now be unavailable to other devices for the duration of the communication session.

In one embodiment, server 114 may select a plurality of frequency bands for wireless device 108 to use during different portions of the communication session. For example, if a first frequency band is available during a first portion of the desired communication session but not during a second portion of the desired communication session, and if a second frequency band is available during the second portion but not during the first portion, server 114 may select, and enable wireless device 108 to use, the first frequency band for the first portion and the second frequency band for the second portion.

A technical effect of the methods and systems described herein includes at least one of: (a) determining an available spectrum of frequencies within a location over time; (b) receiving a request from a wireless device to access an available spectrum of frequencies for a predefined duration; (c) selecting, by a processor within a communication system, a frequency band within a spectrum that is available to be used by a wireless device for a predefined duration; and (d) transmitting an authorization message to a wireless device to use a selected frequency band.

The embodiments described herein provide an efficient and robust communication system that may be used to provide wireless access to one or more wireless devices using a TV broadcast band of frequencies, or another suitable band of frequencies. A server manages the usage of available spectrum within the TV broadcast band (or another band) at a location over time. The server receives a request from a wireless device and determines whether the wireless device is authorized to use the spectrum at the location for a requested duration or time. The server also determines one or more portions of the spectrum that are available to be used for the requested duration. The wireless device transmits a request to access the spectrum at a desired level of service. The server determines whether sufficient spectrum is available to enable the wireless device to operate at the desired level of service, and selects a frequency band within the available spectrum. The server transmits an authorization message to the wireless device to enable the wireless device to use the selected frequency band at the desired level of service. If insufficient spectrum is available to enable the wireless device to operate at the desired level of service, the server determines whether sufficient spectrum is available to operate the wireless device at a lower level of service. If insufficient spectrum is available to operate at the lower level of service, the server transmits an error message to the wireless device. However, if sufficient spectrum is available to operate the wireless device at the lower level of service, the server selects a frequency band for use with the lower level of service and transmits an authorization message to the wireless device to use the selected frequency band. Accordingly, the server efficiently manages the available TV broadcast band spectrum (or another band) within a location and enables a plurality of wireless devices to access the TV broadcast band.

Exemplary embodiments of servers and methods for operating a communication system are described above in detail. The servers and the methods are not limited to the specific embodiments described herein but, rather, components of the servers and/or steps of the methods may be utilized independently and separately from other components and/or steps described herein. Further, the described operations and/or components may also be defined in, or used in combination with, other systems, methods, and/or networks, and are not limited to practice with only the communication system as described herein.

The systems described herein are not intended to suggest any limitation as to the scope of use or functionality of any aspect of the disclosure. In addition, the systems described herein should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A server comprising:
a memory device configured to store a plurality of computer-executable instructions; and
a processor coupled to said memory device, wherein, when said processor executes the plurality of computer-executable instructions, said processor is programmed to:
determine an available spectrum of frequencies within a location over time, the determination made by determining a geospatial usage of the spectrum relative to time based on an expected spectrum usage over time by at least one registered device authorized to use the spectrum, a measured or estimated usage of the spectrum over time by at least one unregistered device, and a historical usage of the spectrum at the location;
receive a request from a wireless device to access the available spectrum for a predefined duration at a first level of service;
determine whether sufficient spectrum is available to enable the wireless device to operate at the first level of service;
determine whether sufficient spectrum is available to enable the wireless device to operate at a second level of service that is lower quality than the first level of service upon a determination that sufficient spectrum is not available to enable the wireless device to operate at the first level of service;
select a frequency band within the spectrum that is available to be used by the wireless device for the predefined duration at the first or second level of service; and
transmit an authorization message commanding the wireless device to use the selected frequency band.

2. A server in accordance with claim 1, wherein said processor is further programmed to receive a request from the wireless device to operate at a first level of service.

3. A server in accordance with claim 1, wherein said processor is further programmed to select the frequency band within the available spectrum that enables the wireless device to operate at the first level of service upon the determination that sufficient spectrum is available.

4. A server in accordance with claim 1, wherein, upon the determination that sufficient spectrum is not available to enable the wireless device to operate at the second level of service, said processor is further programmed to transmit an error message to the wireless device.

5. A server in accordance with claim 1, wherein said processor is further programmed to determine an available spectrum of frequencies of a television broadcast band within the location over time.

6. A server in accordance with claim 1, wherein a database is communicatively coupled to said server, said processor is further programmed to determine the spectrum that is available within the location by receiving data from the database; and update the database to reflect the selected frequency band used by the wireless device for the predefined duration.

7. A server in accordance with claim 1, wherein said processor is further programmed to determine whether the wireless device is included within a list of authorized device for at least one of the location and/or the spectrum.

8. A server in accordance with claim 1, wherein the first and second levels of service include at least one of a bandwidth, a latency, a priority level, an amount of jitter or interference, and a duration of a desired communication session.

9. A server in accordance with claim 1, wherein to determine whether sufficient spectrum is available, said processor is further programmed to determine the available spectrum based on the desired duration of a communication session and on a determination of which frequency bands are expected to be available during a time of the communication session.

10. A method of operating a communication system, said method comprising:
    determining an available spectrum of frequencies within a location over time, the determination made by determining a geospatial usage of the spectrum relative to time based on an expected spectrum usage over time by at least one registered device authorized to use the spectrum, a measured or estimated usage of the spectrum over time by at least one unregistered device, and a historical usage of the spectrum at the location;
    receiving a request from a wireless device to access the available spectrum for a predefined duration at a first level of service;
    determining whether sufficient spectrum is available to enable the wireless device to operate at the first level of service;
    determining whether sufficient spectrum is available to enable the wireless device to operate at a second level of service that is lower quality than the first level of service upon a determination that sufficient spectrum is not available to enable the wireless device to operate at the first level of service;
    selecting, by a processor within the communication system, a frequency band within the spectrum that is available to be used by the wireless device for the predefined duration at the first or second level of service; and
    transmitting an authorization message commanding the wireless device to use the selected frequency band.

11. A method in accordance with claim 10, further comprising receiving a request from the wireless device to operate at a first level of service.

12. A method in accordance with claim 10, further comprising selecting the frequency band within the available spectrum that enables the wireless device to operate at the first level of service upon the determination that sufficient spectrum is available.

13. A method in accordance with claim 10, wherein, upon the determination that sufficient spectrum is not available to enable the wireless device to operate at the second level of service, said method further comprises transmitting an error message to the wireless device.

14. A method in accordance with claim 10, wherein determining an available spectrum of frequencies comprises determining an available spectrum of frequencies of a television broadcast band within the location over time.

15. A method in accordance with claim 10, further comprising determining the spectrum that is available within the location by receiving data from a database.

16. A method in accordance with claim 15, further comprising updating the database to reflect the selected frequency band used by the wireless device for the predefined duration.

* * * * *